United States Patent
Gerrits et al.

(10) Patent No.: US 10,851,226 B2
(45) Date of Patent: *Dec. 1, 2020

(54) HIGH DENSITY POLYETHYLENE

(71) Applicant: SABIC GLOBAL TECHNOLOGIES B.V., Bergen op Zoom (NL)

(72) Inventors: Niclasina Siberta Johanna Alberdina Gerrits, Sittard (NL); Harmen Maria Hendrik de Jonge, Sittard (NL); Martin Antonius van Es, Brunssum (NL); Peter Emmanuel Joseph Cuijpers, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 243 days.

This patent is subject to a terminal disclaimer.

(21) Appl. No.: 15/570,577

(22) PCT Filed: Apr. 25, 2016

(86) PCT No.: PCT/EP2016/059134
§ 371 (c)(1),
(2) Date: Oct. 30, 2017

(87) PCT Pub. No.: WO2016/173967
PCT Pub. Date: Nov. 3, 2016

(65) Prior Publication Data
US 2018/0127572 A1    May 10, 2018

(30) Foreign Application Priority Data
Apr. 30, 2015 (EP) .................................... 15165875

(51) Int. Cl.
*C08J 3/28* (2006.01)
*C08L 23/06* (2006.01)
*C08J 9/12* (2006.01)
*C08J 9/14* (2006.01)

(52) U.S. Cl.
CPC ................ *C08L 23/06* (2013.01); *C08J 3/28* (2013.01); *C08J 9/122* (2013.01); *C08J 9/127* (2013.01); *C08J 9/141* (2013.01); *C08J 2201/026* (2013.01); *C08J 2201/03* (2013.01); *C08J 2203/06* (2013.01); *C08J 2203/14* (2013.01); *C08J 2203/182* (2013.01); *C08J 2205/046* (2013.01); *C08J 2205/052* (2013.01); *C08J 2323/06* (2013.01); *C08L 2207/062* (2013.01)

(58) Field of Classification Search
CPC ........................................... C08L 23/06–0815
See application file for complete search history.

(56) References Cited

U.S. PATENT DOCUMENTS

| | | | |
|---|---|---|---|
| 5,508,319 A * | 4/1996 | DeNicola, Jr. | C08J 3/28 522/161 |
| 5,552,104 A | 9/1996 | DeNicola, Jr. et al. | |
| 5,916,926 A * | 6/1999 | Cooper | C08J 9/06 521/149 |
| 6,169,122 B1 | 1/2001 | Blizard et al. | |
| 6,221,925 B1 * | 4/2001 | Constant | C08J 9/00 521/149 |
| 6,376,059 B1 | 4/2002 | Anderson et al. | |
| 2018/0354237 A1 | 12/2018 | De Jonge et al. | |
| 2019/0023866 A1 | 1/2019 | Gerrits et al. | |

FOREIGN PATENT DOCUMENTS

| | | |
|---|---|---|
| EP | 1642926 A1 | 4/2006 |
| EP | 2246175 A1 | 11/2010 |
| JP | 201483770 A | 5/2014 |
| WO | 9824836 A1 | 6/1998 |
| WO | 0064967 A1 | 11/2000 |

OTHER PUBLICATIONS

"Melt Elasticity/Strength" by Gottfert. Available at https://www.goettfert.com/application-knowledge/applications/for-capillary-rheometer/melt-elasticitystrength.html. Accessed Sep. 10, 2019 (Year: 2019).*
International Search Report for International Application No. PCT/EP2016/059134; International Filing Date: Apr. 25, 2016; dated Jun. 16, 2016; 6 Pages.
Written Opinion of the International Searching Authority for International Application No. PCT/EP2016/059134; International Filing Date: Apr. 25, 2016; dated Jun. 16, 2016; 7 Pages.
Ruinaard "How to Choose a Polyolefin Grade for Physical Foaming" RAPRA Conference Presentation—Blowing Agents and Foaming Processes (2005); 32 Pages.
Weber et al., "Foamed Plastics" Ullmann's Encyclopedia, 2002, Wiley VCH Verlag, 54 Pages.

* cited by examiner

*Primary Examiner* — Michael M Dollinger
*Assistant Examiner* — Christina H. W. Rosebach
(74) *Attorney, Agent, or Firm* — Cantor Colburn LLP

(57) ABSTRACT

The invention is directed to HDPE having a quotient of melt strength according to ISO 16790:2005 and apparent viscosity according to ISO 11443:2014 (melt strength/apparent viscosity)>2 cN/k·Pa·s and ≤30 cN/k·Pa·s. In a preferred embodiment, HDPE with an Ml in the range between ≥0.1 and ≤10 a density in the range between ≥935 and ≤970 kg/m³ a gel fraction less than 5% and an elasticity (ratio of G'/G" at 0.1 rad/sec) between ≥0.6 and ≤10 is obtained by chain branching HDPE with an Ml in the range between ≥10 and ≤100 a density in the range between ≥935 and ≤970 kg/m³ and an elasticity (ratio of G'/G" at 0.1 rad/sec) between ≥0.01 and ≤0.2.

8 Claims, No Drawings

HIGH DENSITY POLYETHYLENE

CROSS REFERENCE TO RELATED APPLICATIONS

This application is a 371 of International Application No. PCT/EP2016/059134, filed Apr. 25, 2016, which claims priority to European Application No. 15165875.4, filed Apr. 30, 2015 which are incorporated herein by reference in their entirety.

The invention relates to high density polyethylene (HDPE). The high density polyethylene is suitable to be applied in foam compositions.

Polyethylene foams are described in Ullmann's Encyclopedia "Foamed Plastics" by Heinz Weber et al. (2002; Wiley VCH Verlag). These foams are classified as low density and high density foams. These foams may be non-crosslinked or crosslinked foams. Most polyolefin foams and most polyethylene foams are made from low density polyethylene (LDPE). Polyolefin foam may be produced via a chemical blowing process or via a physically blowing process. An important polyolefin foam is physically blown polyethylene foam which is commonly produced with blowing agents for example isobutane, pentane and cyclopentane.

The object of the present invention is to provide HDPE suitable for physical foaming via extrusion and to reach a weight reduction of more than 20% and obtaining the desired values for the mechanical properties such as for example flexural rigidity and impact.

The invention is characterized in that HDPE has a melt strength/apparent viscosity $>2$ cN/k·Pa·s and $\leq 30$ cN/k·Pa·s wherein the melt strength is determined as described in ISO 16790:2005 and the apparent viscosity is determined as described in ISO 11443:2014.

To determine the quotient of melt strength and apparent viscosity (which means a melt strength/apparent viscosity) the melt strength is determined as described in ISO 16790:2005 using a capillary rheometer with a drawing device that pulls the molten polymer from the capillary die at a constant flow rate and at increasing drawing velocity. The capillary rheometer is operated at a temperature of 190° C. The preheating time is 300 seconds. The piston speed is 0.049 mm/s and the barrel diameter is 12 mm as a consequence the throughput is 5.5 mm$^3$/s and the apparent shear rate is 7 s$^{-1}$. The capillary has a length of 40 mm and a diameter of 2 mm and an entrance angle of 180° (flat). The take-off wheels operate at an initial speed of 1.8 mm/s and an acceleration of 1.2 mm/s$^2$. The melt strength is the maximum value of the drawing force which is usually realized at break of the extrudate.

The apparent viscosity is determined as described in ISO 11443:2014 using the same capillary rheometer and the same test conditions as described above for the determination of the melt strength. The apparent viscosity [Pa·s] is defined as the quotient of the apparent shear stress and the apparent shear rate.

Preferably the melt strength $\geq 9$ cN.

More preferably the melt strength $\geq 10$ cN.

The melt index ranges between $\geq 0.1$ and $\leq 10$ (measured according ISO1133-1:2011 at a temperature of 190° C. and at a load of 2.16 kg).

HDPE according to the invention results in the combination of high melt strength and a sufficiently low viscosity to enable foam processing with a good cell structure.

According to a preferred embodiment of the invention HDPE with characteristics

MI in the range between $\geq 0.1$ and $\leq 10$ density in the range between $\geq 935$ and $\leq 970$ kg/m$^3$ a gel fraction less than 5% and an elasticity (ratio of G'/G" at 0.1 rad/sec) between $\geq 0.6$ and $\leq 10$ is obtained by chain branching HDPE with characteristics MI in the range between $\geq 10$ and $\leq 100$ density in the range between $\geq 935$ and $\leq 970$ kg/m$^3$ and an elasticity (ratio of G'/G" at 0.1 rad/sec) between $\geq 0.01$ and $\leq 0.2$.

According to a further preferred embodiment of the invention HDPE with characteristics MI in the range between $\geq 0.1$ and $\leq 10$ density in the range between $\geq 940$ and $\leq 970$ kg/m$^3$ a gel fraction less than 3% and an elasticity (ratio of G'/G" at 0.1 rad/sec) between $\geq 0.7$ and $\leq 2$ is obtained by chain branching HDPE with characteristics MI in the range between $\geq 12$ and $\leq 30$ density in the range between $\geq 940$ and $\leq 970$ kg/m$^3$ and an elasticity (ratio of G'/G" at 0.1 rad/sec) between $\geq 0.01$ and $\leq 0.2$.

According to another preferred embodiment of the invention HDPE with characteristics MI in the range between $\geq 0.1$ and $\leq 5$ density in the range between $\geq 945$ and $\leq 965$ kg/m$^3$ a gel fraction less than 2% an elasticity (ratio of G'/G" at 0.1 rad/sec) between $\geq 0.8$ and $\leq 1.3$ is obtained by chain branching HDPE with characteristics MI in the range between $\geq 12$ and $\leq 30$ density in the range between $\geq 945$ and $\leq 965$ kg/m$^3$ and an elasticity (ratio of G'/G" at 0.1 rad/sec) between $\geq 0.01$ and $\leq 0.1$.

According to a preferred embodiment of the invention the chain branching of HDPE takes place by irradiation.

According to a preferred embodiment of the invention irradiation takes place via electron beam (EB) irradiation, X-ray irradiation or gamma irradiation.

According to a further preferred embodiment of the invention irradiation takes place via electron beam (EB) irradiation.

EB irradiation is discussed in for example U.S. Pat. Nos. 5,508,319A, 5,552,104A, and by Keizo Makuuchi and Song Cheng, in Irradiation Processing of Polymer Materials and Its Industrial Applications, (ISBN 978-0-470-58769-0, editor John Wiley & Sons, 2012).

Suitable HDPE can be produced by chromium/silica catalysts, Ziegler-Natta catalysts or metallocene catalysts.

The chain branched HDPE may also comprise other polymers such as for example low density polyethylene (LDPE), linear low density polyethylene (LLDPE) (C$_4$, C$_6$ and C$_8$ copolymers), ethylene vinyl acetate (EVA), ethylene methacrylic acid (EMA) and/or polyethylene obtained with a metallocene catalyst having for example a density in the range between 880 and 930 kg/m$^3$.

Furthermore the chain branched HDPE may contain additives such as flame retardants, fillers, insulation promoters, slip agents, pigments, lubricants, antistatic agents, processing stabilizers, chemical blowing agents and/or UV stabilizers. These additives will be selected by the man skilled in the art from the generally known agents. These additives may be added pure or as a masterbatch before mixing this masterbatch with the polymer to be foamed.

HDPE foam may be produced via a chemical blowing process or via a physically blowing process of the HDPE foam composition. The preferred process is physically blowing process.

The density of the resulting HDPE foam ranges between ≥100 and ≤500 kg/m³ preferably between ≥200 and ≤400 kg/m³.

The foam has more than 90% closed cells, preferably more than 95% closed cells.

The HDPE foam can be produced for example through extrusion technology. In this process the blowing gas is injected directly into the PE melt under pressure and homogeneously dissolved and mixed in the molten polyethylene. A minimum pressure, which depends on the gas used and the prevailing melt temperature, is needed to keep the gas dissolved in the PE melt. This pressure needs to be maintained through to the extruder in order to prevent the gas from expanding prematurely from the melt. On exiting from the die, the melt pressure decreases to the atmospheric pressure and the dissolved gas expands immediately from the melt to form the foam.

The obtained extrusion HDPE foam has a closed cell structure, a narrow cell size distribution, a low density, good flexural rigidity and good impact strength.

The density of the foamed structure is reduced by a factor of 5 and the flexural rigidity is increased by more than a factor 2 preferably even more than a factor 10.

A weight reduction of 20% results in a high sustainability score, because less polymer is used for a specific application and less polymer is wasted.

Requirements for physical foaming of polyolefin compositions are disclosed in "How to choose a polyolefin grade for physical foaming" by Henk Ruinaart (Blowing agents and foaming processes 2005; Stuttgart Germany 10-11 May 2005).

The foaming conditions in the physical foaming process depend in part on the applied polymer. Generally, the temperature is close to the crystallisation temperature of the polymer.

The HDPE foam composition may comprise cell stabilizers selected from for example glycerol monostearate (GMS), glycerol monopalmitate (GMP), glycol di-stearate (GDS), palmitides and/or amides for example stearyl stearamide, palmitamide and/or stearamide.

The HDPE foam composition may also comprise a nucleating agent. Suitable nucleating agents include for example an amide, an amine, an ester of an aliphatic ($C_{10}$-$C_{34}$) carboxylic acid talcum, micro talcum and a mixture of sodium bicarbonate and citric acid. The acid may be a saturated or unsaturated acid. Examples of suitable amides include fatty acid (bis)amides for example caproamide, caprylamide, undecylamide, lauramide, myristamide, palmitamide, behenamide and arachidamide, hydroxystearamides and alkylenediyl-bis-alkanamides, preferably ($C_2$-$C_{32}$) alkylenediyl-bis-($C_2$-$C_{32}$) alkanamides, for example ethylene bistearamide, butylene bistearamide, hexamethylene bistearamide and/or ethylene bibehenamide.

The foaming process of HDPE takes place at temperatures between 120° C. and 140° C. Suitable physical blowing agents include for example isobutane, $CO_2$, pentane, butane, nitrogen and/or a fluorohydrocarbon. Preferably the physical blowing agent is isobutane, isobutane with $CO_2$, nitrogen or pure $CO_2$. According to a preferred embodiment of the invention HDPE foam is obtained with a physically foaming process at a temperature between 120° C. and 140° C. with use of isobutane, isobutane with $CO_2$, nitrogen or pure $CO_2$ as the physical blowing agent.

The foam obtained with the HDPE composition according to the invention may be used as for example in the production of film, sheet, profiles, rods and tubes. Examples are foam sheeting for floor insulation, foam section for protecting glass plates, foamed heat insulation tubing for hot-water pipes, foamed packaging film, foam sheeting for floor insulation, foam section for protecting glass plates, foamed heat insulation tubing for copper hot-water pipes, foamed packaging film and decoration.

The foam obtained with the polyolefin resin composition according to the invention may be used as for example in the production greenhouse film, consumer trash bag, grocery bag, produce bag, pallet wrap, food wrap, liners, heavy duty bag, industrial bag, consumer bag, shrink film, label, pouch, tape, stand-up pouch, lamination film, protective film, health and hygiene film.

Other advantages of the foam according to the present invention are easy recycling because the foam is not cross-linked.

Extrusion foam can be used as an inner layer for e.g. pipes.

EP 1642926 discloses a non-crosslinked polyethylene foam obtained by foaming a polyethylene resin satisfying the following requirements (a) to (d):
(a) a density is 890-980 kg/m³;
(b) the number of long chain branches having 6 or more carbon atoms is 0.01-3 per 1,000 carbon atoms;
(c) specific melt tension values and
(d) an endothermic curve obtained in temperature-rise measurement by a differential scanning calorimeter shows one peak.

EP 1642926 discloses a melt strength less than 6.5 cN.

WO 9824836 discloses an article of manufacture comprising a foamed high density polyethylene wherein said polyethylene, prior to foaming, has a density of at least 0.93 g/cc, a melt strength of 5 to 20 grams and a melt viscosity, at 0.1 rad/s, of 4 to 10 (kPa-s); wherein after foaming, the density of the foamed polyethylene is at least 20% less than said at least 0.93 g/cc density. WO 9824836 does not disclose or indicate values for the apparent viscosity. The melt viscosity, at 0.1 rad/s of the polymer according to the present invention is higher than 10 kPa-s.

WO 0064967 is directed to a process for forming articles consisting of foamed HDPE having an original density, prior to foaming, of at least 0.94 g/cc, comprising treating said HDPE, prior to foaming, with a peroxide. This process provides a peroxide treated high density polyethylene. HDPE has a low shear viscosity which is at least about 1.25 times the viscosity of the untreated HDPE measured at 0.1 rad./sec. and a high shear viscosity which is less than about 3.0 times the viscosity of the untreated HDPE measured at 100 rad./sec; admixing the peroxide treated HDPE with a blowing agent; and foaming the peroxide treated HDPE to form a closed cell foam product which exhibits a density reduction, as a result of foaming of over 20%.

The invention will be elucidated by means of the following non-restrictive examples.

EXAMPLES

Electron beam irradiation of HDPE was carried out at Beta-Gamma-Service GmbH (BGS, Germany) in their facility in Bruchsal (10 MeV). In order to improve homogeneity of irradiation dose, HDPE bags were repacked into thinner bags (600×450×100 mm3) containing 12.5 kg HDPE granules. The 100 mm thick bags were radiated with the target irradiation dose on two sides in order to further improve the homogeneity of the irradiation dose.

HDPE was treated with 3000 ppm peroxide (Triganox 101) using a twin-screw extruder with a temperature of 210° C. A nitrogen atmosphere is maintained during reactive extrusion.

The HDPE was characterized by the following measurements:

The melt strength was measured according ISO 16790:2005 using a Göttfert Rheograph 6000 in combination with a Rheotens 71.97. The equipment specifications are:

Oven diameter of 12 mm.

Capillary 40/2 (l/d), length 40 mm, diameter 2 mm, entrance angle 180° (flat).

Pressure transducer: max 200 bar.

The test conditions were as follows: the rheograph was filled in less than one minute and the sample preheating time was 300 seconds. The measuring temperature was 190° C. The speed of the piston was 0.049 mm/s corresponding to a throughput of 5.5 mm$^3$/s and apparent shear-rate of 7 s$^{-1}$. The drawing device (Rheotens 71.97) was operated at an acceleration of 1.2 mm/s$^2$ and a velocity of 1.8 mm/s. The melt strength is expressed in cN.

The apparent viscosity was measured according ISO11443:2014 using the Göttfert Rheograph 6000 and the test conditions being described for the determination of the melt strength. The apparent viscosity is defined as the quotient of the apparent shear stress and the apparent shear rate being 7 s$^{-1}$. The apparent shear stress is calculated from pressure drop in kPa times the capillary diameter in mm divided by 4 times the length of the capillary in mm. The apparent viscosity is usually expressed in kPa·s.

The melt index was measured according ISO1133-1:2011 at a temperature of 190° C. and at 2.16 kg.

The density of the compression molded HDPE disks was measured at a temperature of 23° C. according ISO1183-1:2012 after at least one day of conditioning.

Dynamic mechanical spectroscopy (DMS) frequency sweep measurements were performed on 2 mm disks at a temperature of 190° C. in a nitrogen environment using a parallel plate set-up. The frequency range is 100-0.01 rad/s and the strain was varied between 0.5 and 20% in order to stay in the linear regime. This technique is used to determine the elasticity which is the ratio between the loss modulus and the storage modulus at a frequency of 0.1 rad/s.

The gel content was determined according to ASTM D2765-11. The samples were extracted for 12 hours in o-xylene with 1% anti-oxidant. The xylene insoluble fraction was determined gravimetrically.

Density of the foam samples (around 3×3 cm$^2$ section) was determined by the geometric method according to the ASTM standard D1622-14.

Closed cellular characteristic value. In water in a vessel having water volume sufficient to sink sample in water and a function to be sealed is sunk an expanded product sample of 50×40 mm$^2$ ($V_{sample}$=surface area times thickness; weight: W1) to be held therein, followed by sealing of the vessel. Subsequently, the inner pressure in the vessel is reduced to 0.5 bar and left to stand for 10 minutes. Then, the inner pressure in the vessel is restored to atmospheric and the sample is taken out. The sample is calmly dipped in pure methanol for about 2 seconds, followed by wipe-off of the moisture adhered on the surface, dried in a drier at 60° C. for 5 minutes and thereafter its weight (W2) is measured. Closed cellular characteristic value is calculated by the following formula:

$$\text{Open cell}(\%) = \frac{p \text{ ambient}}{p \text{ vacuum}} \times \frac{\text{volume of absorbed water}}{\text{volume sample}}$$

P ambient=1 bar; P vacuum=0.5 bar $$\text{Volume of absorbed water} = \frac{W2 - W1}{\text{density of water}}$$

in which W1: specimen mass before immersion and W2: specimen mass after immersion The cell size was determined using image analysis of scanning electron micrographs. For scanning electron microscopy, each sample was frozen with liquid nitrogen and fractured. The fractured surface was made conductive by sputtering deposition of gold and observed using a Jeol JSM-820 operating at 20 kV. The microstructure of the materials has been studied in one plane (machine direction, thickness direction). Three micrographs are taken with a magnification of ×30. Analysis of the micrographs has been performed using an image processing tool based on the software Image J. Cell.

Table 1 gives an overview of the HDPE granulate used in the following examples (HDPE I and II and comparative Examples HDPE III and IV).

TABLE 1

| HDPE resin | Catalyst | Co-monomer | Melt index (190° C., 2.16 kg) |
|---|---|---|---|
| HDPE I | Ziegler Natta | C4 | 19.6 |
| HDPE II | Ziegler Natta | C4 | 27.5 |
| HDPE III | Ziegler Natta | — | 9 |
| HDPE IV | Ziegler Natta | C4 | 2.1 |

HDPE I is SABIC grade HDPE CC2056.
HDPE II is SABIC grade HDPE CC3054.
HDPE III is SABIC grade HDPE M80064
HDPE IV is SABIC grade HDPE 3H671

Table 2 shows the melt index, density and gel fraction of electron beam irradiated HDPE materials. The melt index decreases with increasing dose.

TABLE 2

| | Melt index, density and gel fraction | | | |
|---|---|---|---|---|
| HDPE resin | Irirradiation dose kGy | Melt index (190° C., 2.16 kg) | Density kg/m$^3$ | Gel fraction % |
| HDPE I | 0 | 19.6 | 956 | 0.7 |
| HDPE I | 30 | 0.6 | 953 | 1.2 |
| HDPE I | 40 | 0.1 | 953 | 1.5 |
| HDPE II | 0 | 30 | 953 | 0.7 |
| HDPE II | 30 | 1.4 | 950 | 0.8 |
| HDPE II | 40 | 0.4 | 950 | 1.0 |
| HDPE I | 3000 ppm peroxide | 0.5 | 950 | 0 |

Table 3 shows the mechanical shear of electron beam irradiated HDPE materials.

TABLE 3

Dynamic mechanical shear

| HDPE resin | Irradiation dose kGy | Viscosity at 0.1 rad/sec kPa · s | Viscosity at 100 rad/sec kPa · s | Elasticity at 0.1 rad/sec (G'/G'') |
|---|---|---|---|---|
| HDPE I | 0 | 0.5 | 0.27 | 0.02 |
| HDPE I | 30 | 18.7 | 0.6 | 0.8 |
| HDPE I | 40 | 45.2 | 0.7 | 1.2 |
| HDPE II | 0 | 0.3 | 0.2 | 0.02 |
| HDPE II | 30 | 9.7 | 0.45 | 0.6 |
| HDPE II | 40 | 20.6 | 0.50 | 0.9 |
| HDPE I | 3000 ppm peroxide | 44.9 | 1.11 | 0.8 |

Table 4 shows the data for melt strength and apparent viscosity of both unmodified and irradiated HPDE. The melt strength is directly related to the force when the strand breaks. The apparent viscosity is the apparent wall shear stress divided by apparent shear rate.

TABLE 4

Melt strength and apparent viscosity

| HDPE resin | Irradiation dosis kGy | Melt strength cN | Apparent viscosity kPa · s | Ratio between melt strength and apparent viscosity cN/kPa · s |
|---|---|---|---|---|
| HDPE I | 0 | 0.3 | 0.42 | 0.72 |
| HDPE I | 30 | 21.7 | 3.29 | 6.6 |
| HDPE I | 40 | 22.4 | 5.76 | 4.0 |
| HDPE II | 0 | 0.2 | 0.32 | 0.6 |
| HDPE II | 30 | 15.4 | 2.87 | 5.4 |
| HDPE II | 40 | 13.9 | 2.47 | 5.6 |
| HDPE I | 3000 ppm peroxide | 6.8 | 4.7 | 1.5 |

The foam extrusion line was a 60 mm direct gassed single screw extruder with fluid cooled extension barrel and with a metering unit for liquid and gaseous blowing agents, fluid cooled static mixer and melt pump. A 50 mm annular die with tempered die lips and a cooling mandrel (expansion 1:2) were used.

In order to form and stabilize the cells, master batches of various additives were added via a separate feeder (see Table 5 for details on additives). The physical blowing agent was isobutane. The machine settings for extrusion foaming are given in Table 6.

TABLE 5

Additives for extrusion foaming

| Commercial name | Chemical name | Master batch | Role |
|---|---|---|---|
| Schulman PBHFPE50T | Talcum | 50% in LDPE | Nucleator |
| Atmer 7300 PL | GMS | 50% in LDPE | Cell stabilizer |

TABLE 6

Machine settings for extrusion foaming.

| Parameter | Unit | Values foaming |
|---|---|---|
| Throughput | kg/h | 16 |
| Screw speed extruder | rpm | 8 |
| Extrusion temperatures | ° C. | 190 |
| Temperatures in cooling zone | ° C. | 134 to 140 |
| Temperatures in mixer and die | ° C. | 132 to 140 |
| Take off speed | m/min | 1.7 to 2.6 |

TABLE 7

Process conditions for foaming with isobutane and talcum as additive in % by weight. All examples have 1.0% by weight GMS

| | HDPE | Die pressure bar | Die temperature ° C. | Isobutane % | Talcum % |
|---|---|---|---|---|---|
| A | HDPE III | 22 | 127 | 1.9 | 1.5 |
| B | HDPE IV | 23 | 132 | 2.0 | 1.5 |
| C | HDPE I - 3000 ppm peroxide | 41 | 130 | 2.4 | 1.0 |
| I | HDPE I - 30 kGy | 32 | 129 | 1.7 | 1.0 |
| II | HDPE I - 30 kGy | 32 | 129 | 2.4 | 1.0 |
| III | HDPE I - 40 kGy | 53 | 129 | 2.3 | 1.0 |
| IV | HDPE II - 40 kGy | 31 | 133 | 2.3 | 1.0 |

TABLE 8

Foam characteristics

| | HDPE | Density kg/m$^3$ | Open Cell % | Cell size μm |
|---|---|---|---|---|
| A | HDPE III | 222 | 10.2 | 679 |
| B | HDPE IV | 275 | 2.4 | 602 |
| C | HDPE I - 3000 ppm peroxide | 264 | 20.7 | n.d. |
| I | HDPE I - 30 kGy | 228 | 0.2 | 684 |
| II | HDPE I - 30 kGy | 129 | 1.6 | 837 |
| III | HDPE I - 40 kGy | 192 | 0.2 | 728 |
| IV | HDPE II - 40 kGy | 156 | 1.8 | 831 |

The invention claimed is:

1. HDPE having a melt strength/apparent viscosity >2 cN/k·Pa·s and ≤30 cN/k·Pa·s wherein the melt strength is determined as described in the Procedure section of ISO 16790:2005 and the apparent viscosity is determined as described in ISO 11443:2014,
    wherein the HDPE has
        melt index in the range between ≥0.1 and ≤10
        density in the range between ≥935 and ≤970 kg/m$^3$
        a gel fraction less than 5% and
        an elasticity, ratio of G'/G'' at 0.1 rad/sec, between ≥0.6 and ≤10 is obtained by chain branching HDPE with characteristics
        melt index in the range between ≥10 and ≤100
        density in the range between ≥935 and ≤970 kg/m$^3$ and
        an elasticity, ratio of G'/G'' at 0.1 rad/sec, between ≥0.01 and ≤0.2.

2. HDPE according to claim 1 characterised in that the melt strength of HDPE ≥9 cN.

3. HDPE according to claim 1 characterized in that HDPE with characteristics
    the density in the range between ≥940 and 970 kg/m$^3$
    the gel fraction of less than 3% and
    the elasticity, ratio of G'/G'' at 0.1 rad/sec, between ≥0.7 and ≤2 is obtained by chain branching HDPE with characteristics
        the MI in the range between ≥12 and ≤30 the density in the range between ≥940 and ≤970 kg/m³ and the elasticity, ratio of G'/G" at 0.1 rad/sec, between ≥0.01 and ≤0.2.

4. HDPE according to claim 3 characterized in that HDPE with characteristics melt index in the range between ≥0.1 and ≤5 density in the range between ≥945 and 965 kg/m³ a gel fraction less than 2% and an elasticity, ratio of G'/G" at 0.1 rad/sec, between ≥0.8 and ≤1.3 is obtained by chain branching HDPE with characteristics melt index in the range between ≥12 and ≤30 density in the range between ≥945 and ≤965 kg/m³ and an elasticity, ratio of G'/G" at 0.1 rad/sec, between ≥0.01 and ≤0.1.

5. HDPE according to claim 1 characterized in that the chain branching of HDPE takes place by irradiation.

6. A foam composition comprising HDPE according to claim 1 and a blowing agent characterized in that the density of the resulting HDPE foam ranges between ≥100 and ≤500 kg/m³.

7. A foam composition according to claim 6 characterised in that the HDPE foam is obtained with a physically foaming process at a temperature between 120° C. and 140° C. with use of isobutane, isobutane with $CO_2$, nitrogen or pure $CO_2$ as the physical blowing agent.

8. An article prepared from the composition according to claim 1.

* * * * *